United States Patent [19]

Gupta

[11] Patent Number: 5,284,895
[45] Date of Patent: Feb. 8, 1994

[54] AEROSOL FORMULATION FOR A PNEUMATIC TIRE PUNCTURE SEALER AND INFLATOR WHICH IS NON-FLAMMABLE, NON-EXPLOSIVE, NON-TOXIC, AND WITHOUT ANY OZONE DEPLETING CHEMICALS

[76] Inventor: Pradeep Y. Gupta, c/o IQ Holdings, Inc., 1800 W. Loop South, Suite 1250, Houston, Tex. 77027

[21] Appl. No.: 656,432

[22] Filed: Feb. 19, 1991

[51] Int. Cl.⁵ ............................................... C08K 5/06
[52] U.S. Cl. .................................... 524/378; 524/386; 524/388
[58] Field of Search ........................ 524/378, 386, 388

[56] References Cited

U.S. PATENT DOCUMENTS

| | | | |
|---|---|---|---|
| 4,384,661 | 5/1983 | Page et al. | 524/378 |
| 4,422,877 | 12/1983 | Spitzer et al. | 524/903 |
| 4,518,734 | 5/1985 | Brouillette et al. | 524/378 |
| 5,071,900 | 12/1991 | Page et al. | 524/378 |

*Primary Examiner*—Paul R. Michl
*Assistant Examiner*—Andrew E. C. Merriam

[57] ABSTRACT

This invention provides a unique formulation for a user-safe pneumatic tire sealer and inflator which is non-flammable, non-toxic, ozone-friendly, and environmentally safe. Modifications are possible within the scope of this invention.

7 Claims, No Drawings

AEROSOL FORMULATION FOR A PNEUMATIC TIRE PUNCTURE SEALER AND INFLATOR WHICH IS NON-FLAMMABLE, NON-EXPLOSIVE, NON-TOXIC, AND WITHOUT ANY OZONE DEPLETING CHEMICALS

BRIEF SUMMARY OF THE INVENTION

1. Field of Invention:

This invention relates to a unique formulation for a pneumatic tire puncture sealer and inflator.

2. Background to the Invention (The Prior Art)

Various formulations for tire inflators and sealers are known and in use today. All these presently known formulations fall in one of two groups:

(1) Flammable aerosols propelling a toxic formulation, and (2) Non-flammable but ozone depleting aerosols propelling a toxic formulation.

In group (1), various latex and/or resin sealants are used formulated with ethylene glycol and other chemicals which makes the mixture toxic to humans and animals. Furthermore, an extremely flammable gas like Propane, Butane, or Iso-butane is used as the carrier and to deliver the necessary tire inflation pressures. This combination of liquid chemicals and flammable gas propellant makes products using group (1) formulations User-Unsafe while in storage in the trunk of the car or truck or during use, and unsafe for the tire mechanic while removing the toxic chemicals during puncture repair at some later time.

In group (2), various latex and/or resin sealants are used formulated with ethylene glycol and other chemicals which make the mixture toxic to humans and animals. To achieve non-flammability features, propellent gases like chloro-fluoro-carbons (CFC's), hydro-chloro-fluoro-carbons (HCFC's), and/or chloro-carbons (CC's) like 1-1-1-trichlorethane, are used. These propellents are known to destroy Earth's protective stratospheric ozone layer. Therefore these propellent gases are not ozone-friendly or safe for the environment. This fact is further confirmed by the Federally mandated basis for freezing the production of these compounds to no more than the previous year production levels and the eventual phasing out of production of CFC's, HCFC's, and CC's (ref: The Montreal Protocol and others).

Therefore, there exists the specific need for a non-flammable, non-toxic, and ozone-friendly formulation for a pneumatic tire inflator and sealer. The applicant is not aware of any prior attempts to meet this need by any other party.

SUMMARY OF INVENTION

A formula for a pneumatic tire puncture sealer and inflator, comprising of a water based latex sealant; combination of dimethyl oxide, carbon dioxide and nitrogen as the propellants; water; and emulsion stabilizer and freeze point depressor; pH stabilizer; and an anti-foam agent; to achieve a non-flammable, non-ozone depleting chemical, non-toxic product which is both user-safe and safe for the environment is disclosed. A non-toxic combination of water based latex and resins and other chemicals propelled by a unique combination of gases, when carefully blended in critical proportions and packaged in a suitable metal container, results in a non-flammable aerosol product which is ozone-friendly, and which can be used for sealing and inflating most punctured pneumatic tires, safely and without polluting the environment.

The composition for this invention comprises:

(a) 5 to 25 wt. % of a latex sealant;

(b) 0 to 25 wt. % of a water activated resin with sealant properties;

(c) 25 to 70 wt. % water;

(d) 2 to 55 wt. % dimethyl oxide;

(e) 0 to 5 wt. % carbon dioxide;

(f) 0 to 5 wt. % nitrogen;

(g) 0 to 1.5 wt. % of at least one Ph stabilizer;

(h) 0 to 16 wt. % of at least one non-toxic emulsion stabilizer;

(i) 0 to 16 wt. % of at least one non-toxic freeze point depressor;

(j) 0 to 1 wt. % of at least one non-toxic anti-foam agent.

Obviously there is an intent to use these substances in some amount in the final composition and they will be used as discussed below.

The critical proportions of water and dimethyl oxide in the formulation provides a single phase liquid solution which also acts as the solvent base for the water based sealant and resins.

Carbon dioxide and nitrogen is used in critical proportions to further depress any remaining flammability properties of dimethyl oxide by diluting the proportion concentration of dimethyl oxide and oxygen inside the tire after application.

The use of propylene glycol, a non-toxic chemical, lowers the freeze point of the formulation and stabilizes the emulsion characteristics by preventing separation out of solution. The formulation can be used in all weather climate conditions, from the extreme cold to extreme hot, and has been tested for stability after several freeze-thaw cycles.

A PH stabilizer is used to maintain PH of the water based formulation between 7.5 to 10, to minimize corrosion of the pressurized metal container. The use of an anti-foam agent aids in blending the critical proportions of components of the formulation and packaging the formulation inside the pressurized metal container. Unlike the prior art, this composition is non-flammable, exhibits no toxicity, is safe to store and use, and it is ozone-friendly.

GENERAL DESCRIPTION OF INVENTION

In the preferred embodiment of the invention, a latex sealant; water activated resins with sealant properties, water, dimethyl oxide, carbon dioxide, nitrogen, a PH stabilizer, an anti-foam agent, and propylene glycol as the freeze point stabilizer and emulsion stabilizer, are combined in critical proportions to obtain a propellant-solvent-sealant formulation with non-flammable and non-toxic properties.

The concentration of the principal sealant component of this invention, a water based latex sealant solution, is between 5 to 25 weight percent of the total composition. This sealant may be any polyvinyl acetate polymer and water emulsion, or various other water soluble resin polymer emulsions with sealant properties. This sealant is a stable dispersion of very small polymer particles in water. Solids content is in the range of 30–65 wt. percent, which consists of polymer, surfactant and/or hydrocolloid stabilizers and some inorganic salts.

An embodiment of the invention, this sealant when introduced inside a pneumatic tire, along with the other components of this invention, results in quick drying and hardening of this sealant in and around all puncture holes in the tire, as the propellent gas tries to escape through these holes carrying small amounts of sealant across the puncture hole. The sudden expansion or pressure drop experienced by this escaping sealant results in quick plugging of the punctured hole and within a minute a hard seal is formed, effectively sealing the puncture.

A preferred embodiment of the invention is the use of dimethyl oxide as the principal propellant and carrier for the liquid sealant emulsion and to inflate the punctured tire. Dimethyl oxide is a colorless, odorless compound which exists in the gaseous phase at ambient conditions but easily compresses into an odorless and colorless stable liquid with a boiling point of −12.68 F at 14.7 psia. Dimethyl oxide has all the characteristics of an ideal propellant for application in a tire inflator type product, like high vapor pressure, chemical stability, non-corrosiveness to metals, odorless, and non-toxic. Unlike commonly used (as in the prior art) hydrocarbon propellants, when used in the critical proportions of this invention, dimethyl oxide offers the extra benefits of high miscibility with water and excellent solvency properties. Furthermore, dimethyl oxide does not react with and destroy the stratospheric ozone layer, thereby being classified as Ozone Friendly and Environmentally Safe.

Although dimethyl oxide in its pure form is flammable, the critical proportions of dimethyl oxide, water, and the other embodiments of this invention, result in a non-flammable aerosol while maintaining an acceptable range of vapor pressure and solvency characteristics. Flame extension and closed-drum tests conducted on the complete formulation in this invention have resulted in zero flame extension and no observance of flash confirming a non-flammable formulation.

An embodiment of the invention is the use of water in the range of 25 to 70 weight percent, as the principle solubilizing medium. In this formulation, the critical proportions of water helps lower the viscosity of the sealant-water solution and helps determine the proportion of dimethyl oxide—which is highly soluble in water. Also, the high water content ensures even distribution of sealant inside the tire, quickly, to coat the entire surface inside the tire and plug all small puncture holes.

A preferred embodiment of this invention is the use of carbon dioxide, 0–5 weight percent, and nitrogen, 0–5 weight percent. The flammability of oxide is found to be significantly depressed by the presence or carbon dioxide, nitrogen and water, when used in the critical proportions of this formulations. This enhances the safety of this formulation after use as the tire is deflated by the professional mechanic prior to conducting any tire repair.

Carbon dioxide and nitrogen may have to be injection reverse filled through the valve. This process allows to first fill dimethyl oxide which comprises the largest weight percent of the formulation followed by carbon dioxide and nitrogen. In some instances, it may not be possible to fill both nitrogen and carbon dioxide, because of the low compressibility of both these gases when compared to dimethyl oxide.

The PH stabilizer is included in the formulation to keep the PH value of the formulation between 7.5 and 10.0 to assist in inhibiting corrosion of the pressurized metal container in which the formulation is packaged. Suitable PH stabilizers are ammonia, ammonium hydroxide, triethanolamine, and other amines. The concentration of the PH stabilizer may range between 0–1.5 weight percent.

A preferred embodiment of the invention is the use of propylene glycol, in the critical proportions of the formulation, as an emulsion stabilizer to prevent separation of the homogeneous liquid solution. Propylene glycol also helps in depressing the freeze point of the liquid formulation for use throughout the year even in harsh cold clamate conditions. This component of the formulation may be present in the range of 0 to 16 weight percent of total.

The use of non-toxic propylene glycol in the formulation, when used in the critical proportions, increases the safety of the user from exposure to toxic chemicals in case of spill or misapplication of product. This user-safe formulation also delivers safety benefits to the tire mechanic during repair and cleaning of the inside tire walls, when repairing the tire at any later date.

An anti-foam agent may be used to help increase the volume of carbon dioxide and/or nitrogen, to be injection filled through the valve. The anti-foam agent will alter the surface tension of the solution and aid in the rapid release of the dissolved dimethyl oxide in water upon application of product. Several mineral oils and silica agents have been found suitable as anti-foam agents. The presence of this component in the formulation will range less than 1 weight percent by weight of total.

What I claim is:

1. A nonflammable, nonexplosive pneumatic tire sealer and inflator formulation, in a pressurized aerosol container having a valve, comprising:
   (a) 5 to 25 wt. % of a latex sealant composition;
   (b) some water activated resin with sealant properties in a range from but not including 0 and up to and including 25 wt. %;
   (c) 25 to 70 wt. % water;
   (d) 2 to 55 wt. % dimethyl oxide to achieve a single phase liquid solution of dimethyl oxide in water to act as a solvent base for the latex sealant and resins;
   (e) some carbon dioxide in a range from but not including 0 and up to and including 5 wt. % to achieve a non-explosive aerosol formulation by diluting the proportion concentration of dimethyl oxide and oxygen inside the tire after application;
   (f) 0 to 5 wt. % nitrogen;
   (g) 0 to 1.5 wt. % of at least on pH stabilizer;
   (h) 0 to 16 wt. % of at least one non-toxic emulsion stabilizer;
   (i) 0 to 16 wt. % of at least one non-toxic freeze point depressor;
   (j) some of at least one non-toxic anti-foam agent in a range but not including 0 and up to and including 1 wt. % to blend the components of the formulation and packaging the formulation inside the pressurized container and to increase the amount of carbon dioxide and nitrogen to be injection filled through the valve,
   (k) the pH is between 7.5 and 10.0; and
   (i) solids content is in the range between 30 and 65 wt. %.

2. The composition of claim 1, wherein one or more of several types of water activated resin polymer emulsions with sealant properties is present.

3. The composition of claim 1, wherein there is some pH stabilizer taken from the group of Ammonia, Ammonium Hydroxide, Triethanolamine, and other amines.

4. The composition of claim 1, wherein some amount of nitrogen is present in an amount up to 5 percent by weight of total, whereby tire inflation pressures are increased.

5. The composition of claim 1, wherein propylene glycol is present as the non-toxic emulsion stabilizer.

6. The composition of claim 1, wherein propylene glycol is present as a non-toxic freeze point depressor, whereby extreme cold weather stability, applicability, and performance of the formulation is improved.

7. The composition of claim 1, wherein said non-toxic anti-foam agent is a blend of mineral oils and silica derivatives.

* * * * *